US010103581B2

(12) United States Patent
Kanno et al.

(10) Patent No.: US 10,103,581 B2
(45) Date of Patent: *Oct. 16, 2018

(54) WIRELESS POWER TRANSMISSION SYSTEM

(71) Applicant: Panasonic Intellectual Property Management Co., Ltd., Osaka (JP)

(72) Inventors: Hiroshi Kanno, Osaka (JP); Hiroshi Yamamoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/439,047

(22) Filed: Feb. 22, 2017

(65) Prior Publication Data

US 2017/0163099 A1 Jun. 8, 2017

Related U.S. Application Data

(63) Continuation of application No. 13/453,045, filed on Apr. 23, 2012, now Pat. No. 9,620,995.

(Continued)

(51) Int. Cl.
*H02J 50/12* (2016.01)
*H02J 50/20* (2016.01)
*H02J 50/80* (2016.01)

(52) U.S. Cl.
CPC .............. *H02J 50/12* (2016.02); *H02J 50/20* (2016.02); *H02J 50/80* (2016.02)

(58) Field of Classification Search
CPC ...................................................... H02J 7/00
See application file for complete search history.

(56) References Cited

U.S. PATENT DOCUMENTS 5,768,112 A * 6/1998 Barrett ................ H02M 1/4241
363/132
6,160,374 A * 12/2000 Hayes ..................... H02J 7/025
320/108

(Continued)

FOREIGN PATENT DOCUMENTS

CN 102017362 4/2011
CN 102017363 4/2011

(Continued)

OTHER PUBLICATIONS

Chinese Search report dated May 7, 2015 and English translation thereof for corresponding Chinese application No. 201280001216.9.

(Continued)

*Primary Examiner* — Thienvu Tran
*Assistant Examiner* — David M Stables
(74) *Attorney, Agent, or Firm* — Renner, Otto, Boisselle & Sklar, LLP

(57) ABSTRACT

A wireless power transmission system according to the present disclosure includes: a pair of antennas, between which power is transmissible wirelessly by resonant magnetic coupling at a frequency f0, one of which is a series resonant circuit, and the other of which is a parallel resonant circuit; and a control section, which controls a transmission frequency according to the magnitude of the power being transmitted between the antennas. If the power transmitted between the antennas is greater than a reference value P1, the control section sets the transmission frequency to be a value that falls within a first level range that is higher than the frequency f0. But if the power is smaller than the reference value P1, then the control section sets the transmission frequency to be a value that falls within a second level range that is lower than the first level range.

11 Claims, 18 Drawing Sheets

Related U.S. Application Data

(60) Provisional application No. 61/479,142, filed on Apr. 26, 2011.

(56) References Cited

U.S. PATENT DOCUMENTS

| | | |
|---|---|---|
| 2008/0278264 A1 | 11/2008 | Karalis et al. |
| 2010/0007307 A1 | 1/2010 | Baarman et al. |
| 2010/0052811 A1 | 3/2010 | Smith |
| 2010/0081379 A1 | 4/2010 | Cooper et al. |
| 2010/0109443 A1 | 5/2010 | Cook et al. |
| 2010/0219695 A1 | 9/2010 | Komiyama et al. |
| 2011/0025132 A1 | 2/2011 | Sato |
| 2011/0037322 A1 | 2/2011 | Kanno |
| 2011/0046438 A1 | 2/2011 | Iwaisako |
| 2011/0062793 A1 | 3/2011 | Azancot et al. |
| 2011/0074348 A1 | 3/2011 | Villa Gazulla et al. |

FOREIGN PATENT DOCUMENTS

| | | |
|---|---|---|
| JP | 2008-263710 | 10/2008 |
| JP | 2010-136464 | 6/2010 |
| JP | 2011-147213 | 7/2011 |
| JP | 2011-229360 | 11/2011 |
| WO | WO 2010/014634 | 2/2010 |

OTHER PUBLICATIONS

European Search report dated Jun. 26, 2015 for corresponding European application No. 12773195.8.
International Search report for corresponding International application No. PCT/JP2012/002816 dated Jul. 17, 2012.
Co-pending U.S. Appl. No. 13/453,045, filed Apr. 23, 2012.

* cited by examiner

WIRELESS POWER TRANSMISSION SYSTEM

BACKGROUND

1. Technical Field

The present disclosure relates to a resonant magnetic coupling type non-contact power transmission technique for transmitting power wirelessly by resonant magnetic coupling.

2. Description of the Related Art

United States Patent Application Laid-Open Publication No. 2008/0278264 (which will be referred to herein as Patent Document No. 1 for convenience sake; see FIGS. 12 and 14, in particular) discloses a new type of wireless energy transfer system for transferring energy from one of two resonators to the other, and vice versa, through the space between them. That wireless energy transfer system couples the two resonators with each other via the evanescent tail of the oscillation energy of the resonant frequency that is produced in the space surrounding those two resonators, thereby transferring the oscillation energy wirelessly (i.e., by a non-contact method).

Meanwhile, the conventional electromagnetic induction technology is still used today. Many of electronic devices to which these power transmission techniques are applied will receive power with a constant voltage, go through some power conversion, energy transfer and other blocks, and then require the voltage applied to another device to be a constant one. As for audiovisual devices such as a TV set, for example, such a device will receive input power from an outlet that supplies a substantially constant AC power but independent circuits in that device, which eventually dissipate that power supplied, will operate with a predetermined voltage kept applied thereto. Even if the luminance on the screen varies, such a variation can also be coped with by changing the amount of current supplied. Such an operation that receives power with a constant voltage from a power supply and then outputs power with the constant voltage to a load will be referred to herein as a "constant-voltage operation".

SUMMARY

The prior art technique needs further improvement in view of maintaining high-efficiency transmission performance when the system needs to perform a constant voltage operation, no matter whether the power to be transmitted is large or small.

One non-limiting, and exemplary embodiment provides a wireless power transmission system that can output power with a predetermined output voltage in response to power received with a predetermined input voltage and that can maintain high efficiency not just when transmitting a huge amount of power but also when transmitting only a small amount of power as well.

In one general aspect, a wireless power transmission system disclosed herein includes: a pair of antennas, between which power is transmissible wirelessly by resonant magnetic coupling at a frequency f0, one of which is a series resonant circuit, and the other of which is a parallel resonant circuit; and a control section, which controls a transmission frequency according to the magnitude of the power being transmitted between the antennas. If the power is greater than a reference value P1, the control section sets the transmission frequency to be a value that falls within a first level range that is higher than the frequency f0. But if the power is smaller than the reference value P1, then the control section sets the transmission frequency to be a value that falls within a second level range that is lower than the first level range.

According to the above aspect, it is possible to output energy with a predetermined output voltage efficiently in a broad transmission power range in response to the input energy with a predetermined input voltage when transmitting power between antennas by resonant magnetic coupling.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

DETAILED DESCRIPTION

Figure 1A:
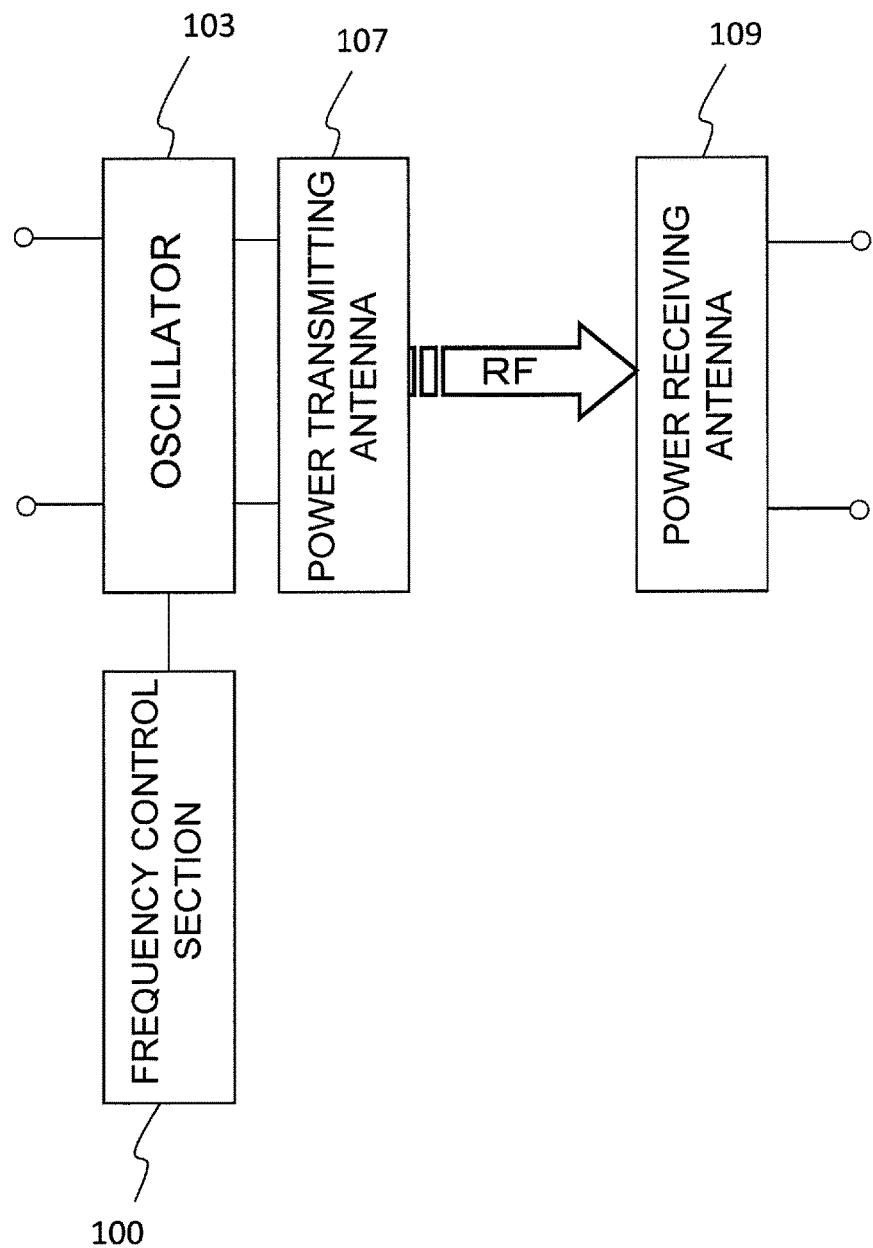
FIG. 1A illustrates an exemplary basic arrangement for a wireless power transmission system according to an exemplary embodiment.
Figure 1B:
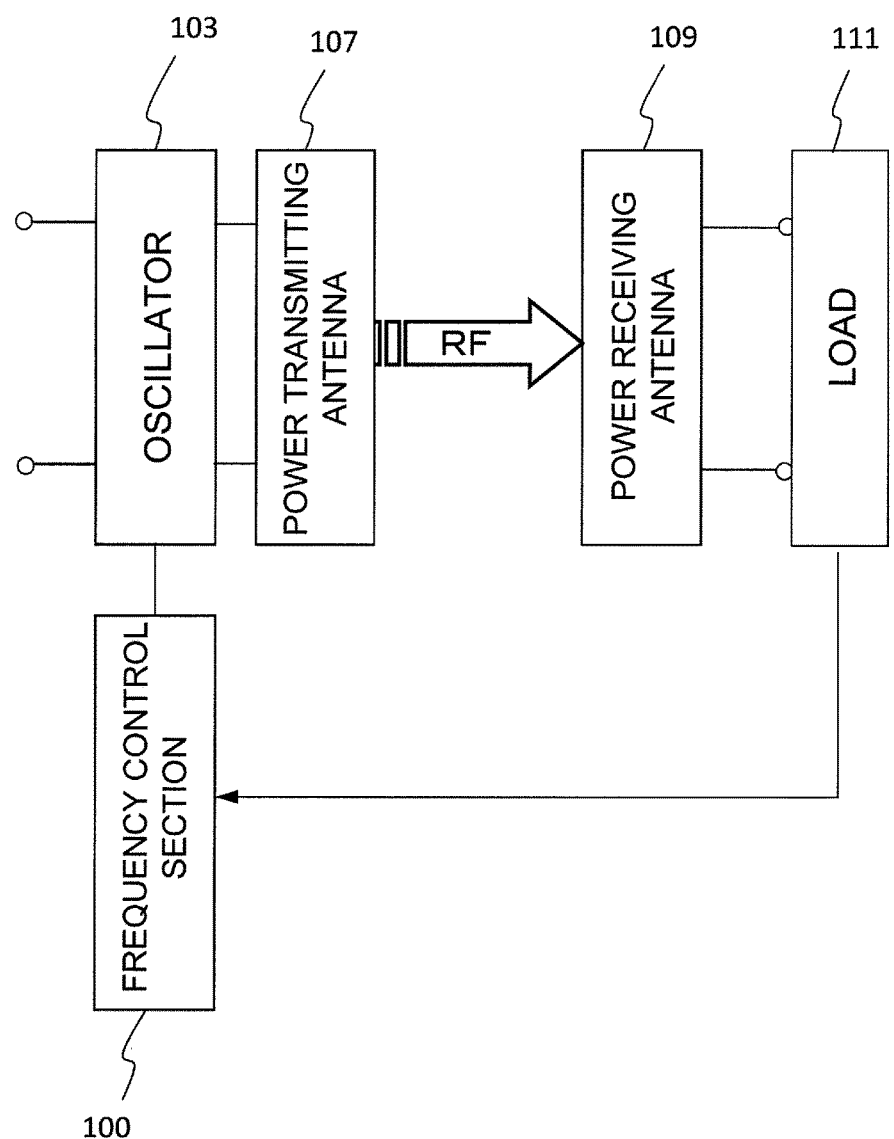
FIG. 1B illustrates another exemplary basic arrangement for a wireless power transmission system according to an exemplary embodiment.

The present inventors found that it is difficult for the wireless energy transfer system disclosed in Patent Document No. 1 to maintain high-efficiency transmission performance if the system always needs to perform such a constant voltage operation, no matter whether the power to be transmitted is large or small.

An exemplary embodiment of the present disclosure provides a wireless power transmission system that can output power with a predetermined output voltage in response to power received with a predetermined input voltage and that can always maintain high efficiency not just when transmitting a huge amount of power but also when transmitting only a small amount of power as well.

(1) In one general aspect, a wireless power transmission system disclosed herein includes: a pair of antennas, between which power is transmissible wirelessly by resonant magnetic coupling at a frequency f0, one of which is a series resonant circuit, and the other of which is a parallel resonant circuit; and a control section, which controls a transmission frequency according to the magnitude of the power being transmitted between the antennas. If the power is greater than a reference value P1, the control section sets the transmission frequency to be a value that falls within a first level range that is higher than the frequency f0. But if the power is smaller than the reference value P1, then the control section sets the transmission frequency to be a value that falls within a second level range that is lower than the first level range.

(2) In one embodiment, if the power has changed from a value that is greater than the reference value P1 into a value that is smaller than the reference value P1, or vice versa, the control section makes the transmission frequency hop between a value falling within the first level range and a value falling within the second level range.

(3) In this particular embodiment, when making the transmission frequency hop, the control section changes the modes of a resonant magnetic field that couples the pair of antennas together from an even mode into an odd mode, and vice versa.

(4) In an embodiment of the wireless power transmission system according to item (1) to (3), if the power to be transmitted is smaller than the reference value P1 but greater than a second reference value P2, which is smaller than the reference value P1, the control section sets the transmission frequency to be equal to or lower than a frequency f2, which is lower than the frequency f0. But if the power to be transmitted is smaller than the second reference value P2, then the control section sets the transmission frequency to be higher than the frequency f2.

(5) In an embodiment of the wireless power transmission system according to item (1) to (4), the first level range starts at the frequency f0 and ends at the resonant frequency fH of the even mode, and the second level range starts at the resonant frequency fL of the odd mode and ends at the frequency f0.

(6) In an embodiment of the wireless power transmission system according to item (1) to (5), if the power to be transmitted is equal to the reference value P1, the control section sets the transmission frequency to be equal to the frequency f0.

(7) In an embodiment of the wireless power transmission system according to item (1) to (6), the frequency of the resonant magnetic field formed by the pair of antennas is equal to the frequency f0.

(8) In an embodiment of the wireless power transmission system according to item (1) to (7), the coupling coefficient k of the pair of antennas is kept constant while the power is being transmitted.

(9) In an embodiment of the wireless power transmission system according to item (1) to (8), the reference value P1 is set to be 60% through 80% of a maximum transmission power Pmax.

(10) In an embodiment of the wireless power transmission system according to item (1) to (9), if the maximum value of the transmission frequency is identified by ftrmax and the resonant frequency of the even mode is identified by fH and if the power is greater than the reference value P1, then the control section sets the maximum value ftrmax of the transmission frequency so that Rhigh defined by the equation Rhigh=(ftrmax−f0)÷(fH−f0)×100 falls within the range of 18% to 56%.

(11) In an embodiment of the wireless power transmission system according to item (1) to (10), if the minimum value of the transmission frequency is identified by ftrmin and the resonant frequency of the odd mode is identified by fL and if the power is smaller than the reference value P1, then the control section sets the minimum value ftrmin of the transmission frequency so that Rlow defined by the equation Rlow=(f0 −ftrmin)÷(f0 −fL)×100 falls within the range of 21% to 45%.

(12) In an embodiment of the wireless power transmission system according to item (1) to (11), when one of the two antennas that is located at a power receiving end has its output terminal connected to a load that follows the antenna, the output impedance Zoc of an oscillator that applies RF energy to the other antenna at a power transmitting end and the input impedance Zin of the antenna at the power transmitting end are equal to each other.

(13) In an embodiment of the wireless power transmission system according to item (1) to (12), when the output terminal of an oscillator that applies RF energy to one of the two antennas that is located at a power transmitting end is connected to the input terminal of the antenna at the power transmitting end, the output impedance Zout of the other antenna at a power receiving end and the input impedance of a load that follows the antenna are equal to each other.

Hereinafter, embodiments of the present disclosure will be described more concretely.

As shown in FIG. 1A, an embodiment of a wireless power transmission system according to the present disclosure includes a pair of antennas 107 and 109, between which power can be transmitted by a non-contact method by resonant magnetic coupling at a frequency f0, and a control section (i.e., a frequency control section) 100 that controls the transmission frequency according to the magnitude of the power being transmitted between those antennas 107 and 109. One of the two antennas is a series resonant circuit, while the other antenna is a parallel resonant circuit. If the power being transmitted between the antennas 107 and 109 is greater than a reference value P1, the control section 100 sets the transmission frequency to be a value that falls within a first level range that is higher than the frequency f0. But if the power is smaller than the reference value P1, then the control section 100 sets the transmission frequency to be a value that falls within a second level range that is lower than the first level range. This reference value P1 is set to be smaller than the maximum transmission power Pmax and preferably set to be 60% through 80% of the maximum transmission power Pmax. The present inventors discovered that if the power to be transmitted is set to be sufficiently smaller than the maximum transmission power Pmax when the wireless power transmission system that uses such a resonant magnetic coupling performs a constant voltage operation, high transmission efficiency can be maintained by changing the modes of resonant magnetic coupling between the power transmitting and receiving antennas. This is the basic idea of the present disclosure. And the modes of coupling can be changed by varying the transmission frequency depending on whether the power to be transmitted is smaller than the reference value P1 or not.

The wireless power transmission system shown in FIG. 1A includes an oscillator 103 with an oscillation frequency f0. Optionally, as in an alternative embodiment of the present disclosure shown in FIG. 2, a frequency converter 161 may be connected so as to follow the power receiving antenna. The oscillator 103 receives DC or AC energy (or power) from a power supply (not shown) and converts the supplied energy into RF energy with a frequency ftr (i.e., performs a DC/RF or AC/RF conversion). This frequency ftr will be referred to herein as a "transmission frequency".

The RF energy is output from the oscillator 103 to the power transmitting antenna 107 that is connected to the oscillator 103. The power transmitting antenna 107 and the power receiving antenna 109 are a pair of resonators, which are designed so as to have substantially equal resonant frequencies fT and fR. The power transmitting antenna 107 and the power receiving antenna 109 are magnetically coupled together through the resonant magnetic field that has been generated in the surrounding space by their resonators. As a result, through the resonant magnetic coupling, the power receiving antenna 109 can receive highly efficiently at least part of the RF energy that has been transmitted by the power transmitting antenna 107.

Figure 13:
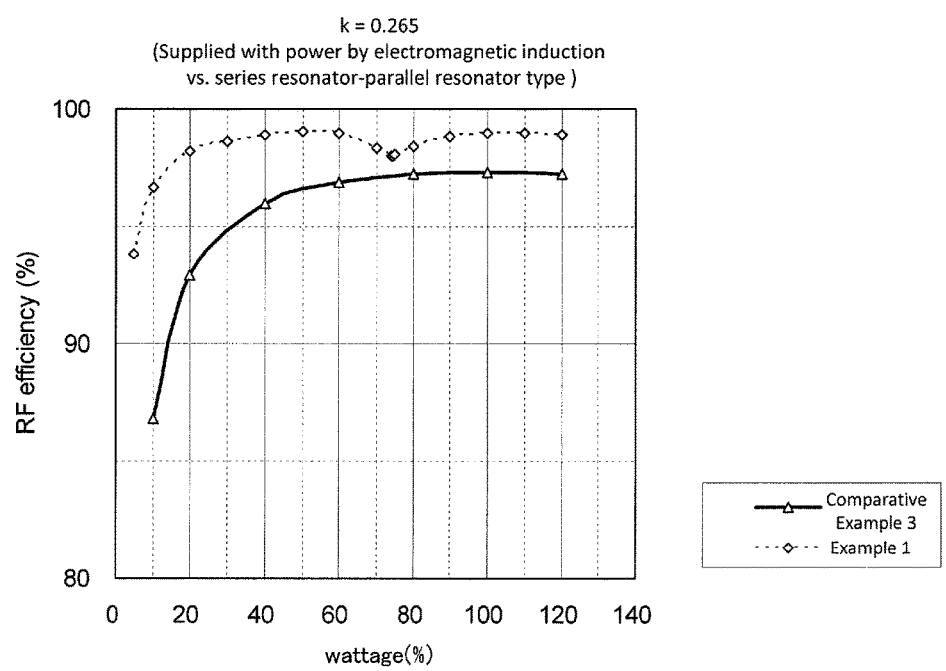
FIG. 13 is a graph showing the transmission power dependence of the transmission efficiency of a wireless transmission section in still another example to be compared to the present disclosure.

The control section 100 generates a signal (which may be a pulse train with a variable frequency) in order to control the oscillation frequency of the oscillator 103 and supplies that signal to the oscillator 103. In an embodiment of the present disclosure, the output of the power receiving antenna 109 is connected to a load 111 as shown in FIG. 13. Depending on the situation in which that load 111 is placed (e.g., how much power the load 111 is dissipating), the magnitude of the power to be transmitted from the power transmitting antenna 107 to the power receiving antenna 109 may change. In the example illustrated in FIG. 13, either information or a signal indicating the magnitude of the power that should be transmitted to the load 111 is provided by the load 111 for the control section 100. In response to that information or signal, the control section 100 can increase or decrease the oscillation frequency of the oscillator 103. As a result, the frequency of the power being transmitted can be controlled.

Figure 1C:
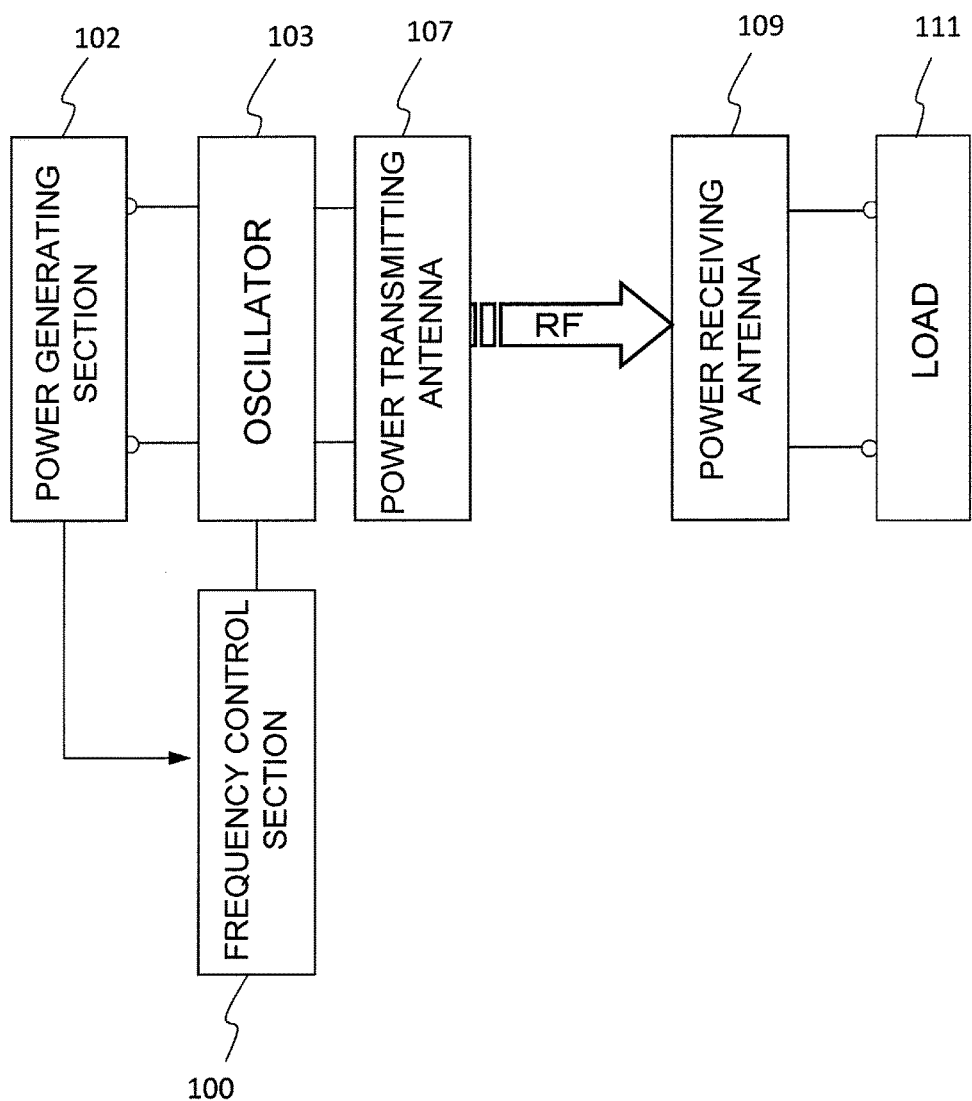
FIG. 1C illustrates still another exemplary basic arrangement for a wireless power transmission system according to an exemplary embodiment.

In another embodiment of the present disclosure, a power generating section 102 may be connected to the oscillator 103 as shown in FIG. 1C and the frequency control section 100 may change the oscillation frequency of the oscillator 103 depending on the situation in which the power generating section 102 is placed. The power generating section 102 includes power generating elements such as solar cells. The magnitude of the power supplied from the power generating section 102 to the oscillator 103 may change depending on the situation in which the power generating section 102 is placed. For example, the power to be supplied may change according to the quantity of sunlight received by the solar cells. As a result, the magnitude of the power to be transmitted from the power transmitting antenna 107 to the power receiving antenna 109 may also change. In the example illustrated in FIG. 1C, either information or a signal indicating the magnitude of the power that has been generated by the power generating section 102, i.e., the magnitude of the power to be transmitted, is provided by the power generating section 102 for the control section 100. In response to that information or signal, the control section 100 can increase or decrease the oscillation frequency of the oscillator 103. As a result, the frequency of the power being transmitted can be controlled.

The relation between the magnitude of the power to be transmitted and the transmission frequency may be defined in advance via experiments, for example, and may be stored in a memory provided for either the wireless power transmission system itself or the load. Alternatively, the transmitted power-transmission frequency relation may also be determined by the transmission efficiency with which the power is actually being transmitted.

Figure 1D:
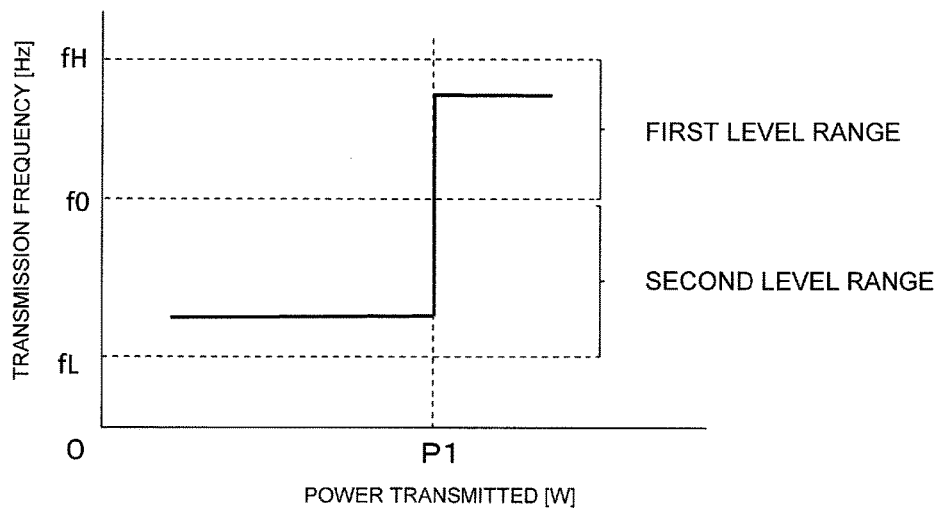
FIG. 1D is a graph showing a relation between the power transmitted and the transmission frequency.

FIG. 1D is a graph showing an exemplary relation between the magnitude and frequency of the power being transmitted. As shown in FIG. 1D, the first level range is higher than the frequency f0. Specifically, in this example, the first level range is supposed to start at the frequency f0 and end at an even-mode resonant frequency fH. On the other hand, the second level range is supposed to start at an odd-mode resonant frequency fL and end at the frequency f0. The even-mode and odd-mode resonant frequencies fH and fL will be described in detail later.

If the power being transmitted has changed from a value that is greater than the reference value P1 into a value that is smaller than the reference value P1, or vice versa, the control section 100 makes the transmission frequency hop between a value falling within the first level range and a value falling within the second level range. In making the transmission frequency hop, the control section 100 changes the modes of the resonant magnetic field that couples the pair of antennas together from the even mode into the odd mode, and vice versa. In an embodiment of the present disclosure, if the power being transmitted is equal to the reference value P1, the transmission frequency may be set to be equal to the frequency f0.

Figure 1E:
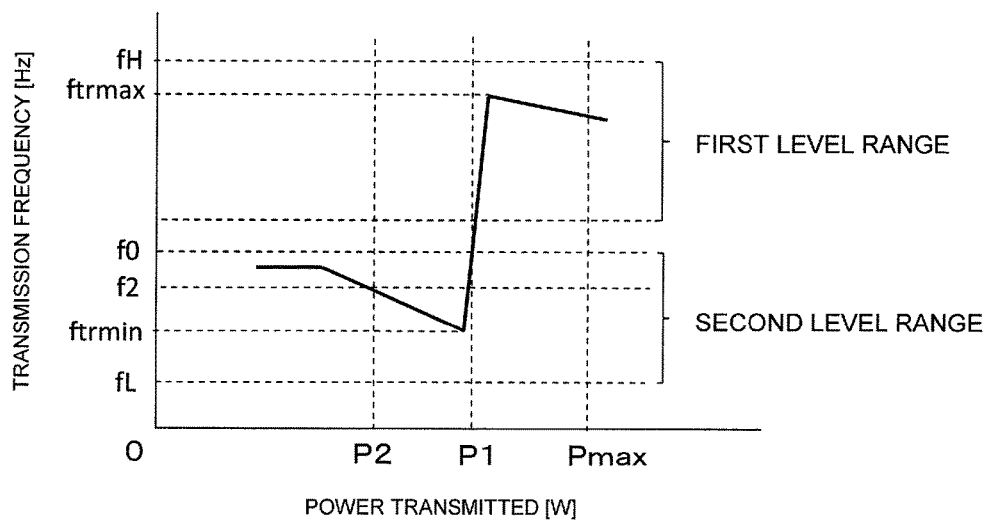
FIG. 1E is a graph showing another relation between the power transmitted and the transmission frequency.

The magnitude of the power being transmitted and the transmission frequency do not always have the relation shown in FIG. 1D. FIG. 1E shows a more complicated relation of theirs. In the example illustrated in FIG. 1E, if the power being transmitted is smaller than the reference value P1 but greater than a second reference value P2, which is smaller than the reference value P1, the control section 100 sets the transmission frequency to be equal to or lower than a frequency f2, which is lower than the frequency f0. But if the power being transmitted is smaller than the second reference value P2, then the control section 100 sets the transmission frequency to be higher than the frequency f2. And if the power being transmitted is sufficiently low (e.g., 10% or less of the maximum transmission power Pmax), the transmission frequency is preferably set to be substantially equal to the frequency f0.

The relation between the magnitude of the power being transmitted and the transmission frequency and the reference values P1 and P2 and other values can be obtained by finding what transmission frequency will optimize the transmission efficiency at a given power being transmitted. A specific exemplary relation between the magnitude of the power being transmitted and the transmission frequency will be described in detail later. It should be noted that the coupling coefficient k between the pair of antennas is preferably kept constant while power is being transmitted.

Figure 2:
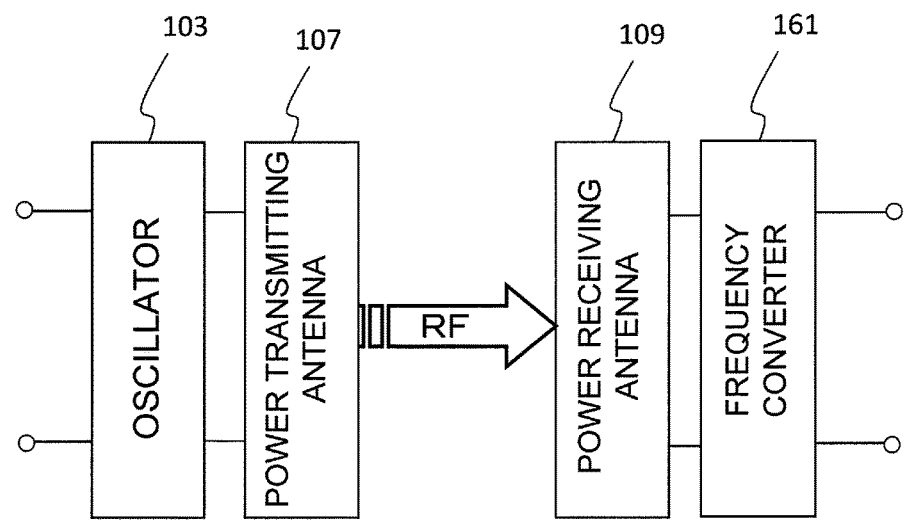
FIG. 2 illustrates a basic arrangement for a wireless power transmission system according to an exemplary embodiment.

The frequency converter 161 shown in FIG. 2 receives the RF energy (power) from the power receiving antenna 109 and converts the frequency of the power into a frequency that will be required by a block on the last stage that sends power to a load or a utility grid. That is why the converted power may have a DC frequency, an AC frequency or any other frequency. The power receiving antenna 109 is not in contact with the power transmitting antenna 107 but is located at a distance of around several millimeters to several ten centimeters. The frequency f0 may be in the range of 50 Hz to 300 GHz, and is preferably set to fall within the range of 20 kHz to 10 GHz, more preferably in the range of 20 kHz to 20 MHz, and even more preferably in the range of 20 kHz to 1 MHz.

In the wireless power transmission system of the present disclosure, the "antenna" is not an ordinary antenna for transmitting or receiving an electromagnetic field radiated but an element for transferring energy from one of two objects to the other, and vice versa, by using a coupling phenomenon that has been produced by the evanescent tail of the magnetic field of the resonator. According to such a wireless power transmission technique that uses the resonant magnetic field, energy loss (radiation loss), which would otherwise be caused when an electromagnetic wave is transferred to a distant location, will not be caused, and therefore, the power can be transmitted with very high efficiency. Such an energy transfer technique that uses the coupling phenomenon of a resonant electromagnetic field (i.e., a near field) will cause much less loss than a known wireless power transmission that uses the Faraday's law of electromagnetic induction. Rather, energy can be transmitted efficiently between two resonators (or antennas), which have an interval of as much as several meters between them.

To carry out a wireless power transmission based on such a principle, coupling needs to be produced between two resonant antennas. fT and/or fR do not have to be exactly equal to f0. To transfer energy with high efficiency by taking advantage of the coupling phenomenon between the two resonators, ideally fT=fR should be satisfied. But actually there will be no problem as long as there is only a little difference between fT and fR. In this description, if the frequency fT is equal to the frequency fR, then the following inequality (1) should be satisfied:

$$|fT-fR| \le fT/QT + fR/QR \quad (1)$$

where QT is the Q factor of the power-transmitting antenna as a resonator and QR is the Q factor of the power-receiving antenna as a resonator. In general, if the resonant frequency is identified by X and the Q factor of a resonator is identified by Qx, a frequency range in which that resonator produces resonance is obtained by X/Qx. If this inequality $|fT-fR| \le fT/QT + fR/QR$ is satisfied, energy can be transferred between the two resonators by resonant magnetic coupling.

Figure 3:
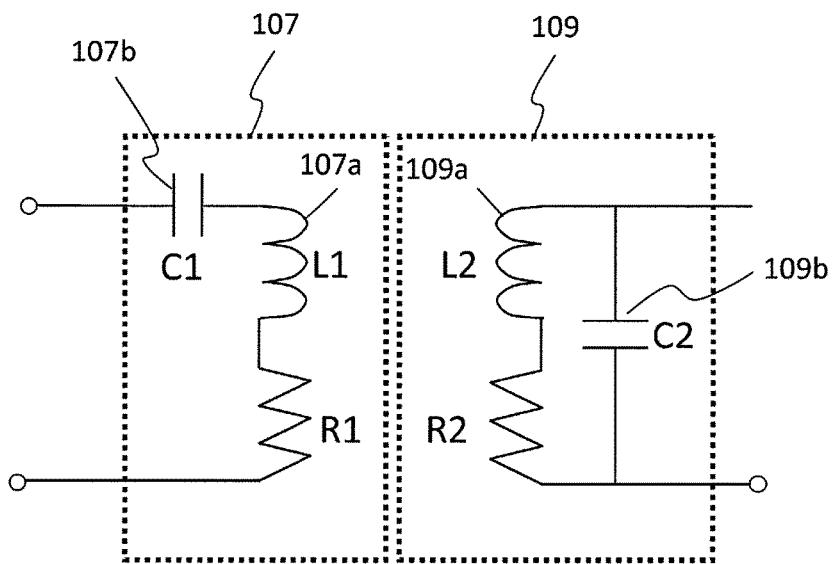
FIG. 3 illustrates the equivalent circuit of a pair of antennas in a wireless power transmission system according to an exemplary embodiment.
Figure 4:
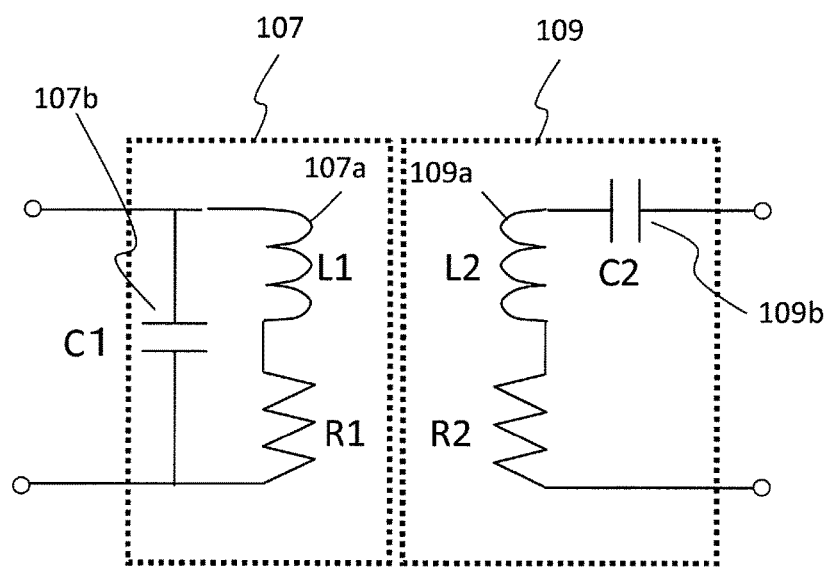
FIG. 4 illustrates the equivalent circuit of a pair of antennas in another wireless power transmission system according to an exemplary embodiment.

On equivalent circuit—asymmetric pair of resonators: combination of series and parallel resonant circuits Next, look at FIG. 3, which illustrates an equivalent circuit of a pair of antennas for use in the wireless power transmission system of the present disclosure. As shown in FIG. 3, the power transmitting antenna 107 of the present disclosure is a series resonant circuit in which a first inductor 107a and a first capacitor 107b are connected together in series. On the other hand, the power receiving antenna 109 is a parallel resonant circuit in which a second inductor 109a and a second capacitor 109b are connected in parallel with each other. The series resonant circuit of the power transmitting antenna 107 has a parasitic resistive component R1, while the parallel resonant circuit of the power receiving antenna 109 has a parasitic resistive component R2. The wireless transmission section of the present disclosure is formed by such an asymmetric pair of antennas, i.e., a combination of a series resonant circuit as the power transmitting antenna and a parallel resonant circuit as the power receiving antenna. That is to say, the same effect can also be achieved even if the power transmitting antenna 107 is implemented as a parallel resonant circuit and the power receiving antenna 109 is implemented as a series resonant circuit as shown in FIG. 4.

In general, it is known that when two resonators that have their own resonant frequencies are electrically coupled together, those resonant frequencies will change. Even if the resonant frequencies of two resonators are the same (e.g., both equal to the frequency f0), the resonant frequency of the pair of resonators splits into two frequencies as a result of the coupling. Of the two resonant frequencies of the pair of resonators that are coupled together, the higher one will be referred to herein as an "even-mode resonant frequency fH" and the lower one as an "odd-mode resonant frequency fL", respectively. Also, k represented by the following Equation (2)

$$k = (fH^2 - fL^2) \div (fH^2 + fL^2) \quad (2)$$

corresponds to the coupling coefficient between the resonators. In this case, the stronger the degree of coupling, the greater the k value and the bigger the difference between the two resonant frequencies that have split.

Naturally, a wireless power transmission system should maintain high transmission efficiency under such an operating condition that turns the power P to transmit into a maximum one Pmax. However, the efficiency should also be kept high even under such a transmission condition for transmitting a reduced power. Furthermore, no matter whether the power to transmit satisfies P=Pmax or P≠Pmax, it is preferred that a constant voltage operation be always performed. That is why the following relations need to be satisfied between the input and output impedances Zin (P=Pmax), Zout (P=Pmax) when P=Pmax and the input and output impedances Zin and Zout when an arbitrary power P is transmitted:

$$Zin = Zin(P=Pmax) \times (Pmax \div P) \quad (3)$$

$$Zout = Zout(P=Pmax) \times (Pmax \div P) \quad (4)$$

That is to say, while a constant voltage operation is performed, the input and output impedances change inversely proportionally to the power to be transmitted. And an object of the present disclosure is to maintain high transmission efficiency in a broad transmission power range. To achieve this object, the transmission frequency ftr of the wireless power transmission system of the present disclosure is controlled so as to change, according to the magnitude of power to be transmitted, within a range that is higher than the frequency fL but lower than the frequency fH. More specifically, in a transmission power range from a predetermined power P1 through Pmax, high-efficiency transmission is realizable by transmitting power in a frequency range in which there will be a lot of contribution from the even-mode resonance. On the other hand, in a transmission power range in which the power to be transmitted is set to be smaller than the predetermined power P1, high-efficiency transmission is realizable by transmitting power in a frequency range in which there will be a lot of contribution from the odd-mode resonance. That is to say, supposing the power to be transmitted is identified by P, f0<ftr<fH is satisfied if P1≤P≤Pmax, but fL<ftr<f0 is satisfied if P<P1.

More specifically, in the P1≤P≤Pmax range, the best ftr (P→P1) when the power to be transmitted is around P1 is set to be higher than the best ftr (P→Pmax) when the power to be transmitted is around Pmax. On the other hand, in the P<P1 range, the best ftr (P→P1) when the power to be transmitted is around P1 is set to be lower than the best ftr (P→0) when the power to be transmitted is very small. That is to say, in an embodiment of the present disclosure, the ftr values to be set in the P≥P1 and P<P1 ranges become discontinuous. Thus, in an embodiment of the present disclosure, the even-mode resonance is used on a low-impedance transmission condition and the odd-mode resonance is used on a high-impedance transmission condition. By changing the resonance modes of the pair of antennas according to the transmission power condition, high transmission efficiency can be maintained with respect to input and output impedances that cover a broad range.

In one embodiment of the present disclosure, the maximum ftr value ftrmax in the P1≤P≤Pmax range is set so that Rhigh defined by the following Equation (5) falls within the range of 18% through 56%:

$$Rhigh=(ftrmax-f0)\div(fH-f0)\times 100 \quad (5)$$

By adopting such setting, a high-efficiency constant-voltage operation is realized in a broad power range. Also, for the same reason, the minimum ftr value ftrmin in the P<P1 range may be set so that Rlow defined by the following Equation (6) falls within the range of 21% through 45%:

$$Rlow=(f0-ftrmin)\div(f0-fL)\times 100 \quad (6)$$

It should be noted that such a phenomenon would never happen unless the power transmitting and power receiving antennas are implemented as a combination of asymmetric resonant circuit structures that are a series resonant circuit and a parallel resonant circuit. That is to say, if the power transmitting and power receiving antennas are implemented as a pair of series resonant circuits or a pair of parallel resonant circuits, the effect of the present disclosure cannot be achieved. Likewise, if both of the power transmitting and power receiving antennas have a circuit configuration to be supplied with energy from an external circuit based on the principle of electromagnetic induction (which will be referred to herein as an "electromagnetic induction power supplied circuit"), the effect of the present disclosure cannot be achieved, either. Furthermore, any other hybrid combination of resonators, such as a combination of a series resonant circuit and an electromagnetic induction power supplied circuit or a combination of a parallel resonant circuit and an electromagnetic induction power supplied circuit, cannot achieve the effect of the present disclosure, either.

The P1 value may be set to be in the range of 60% to 80% of Pmax, for example. However, the P1 value does not always have to fall within such a range but could be outside of that range depending on the situation.

The transmission frequency can be changed easily into any arbitrary value by controlling the oscillation frequency of the oscillator 103.

While power is being transmitted, the coupling coefficient k between the power transmitting and power receiving antennas is preferably kept substantially constant. This is because if the coupling coefficient k varied significantly while power is being transmitted, it would be difficult to achieve the constant-voltage operation with high efficiency.

As the oscillator 103, a class D, E or F amplifier that would realize high efficiency and low distortion may be used. Or a Doherty amplifier could also be used. Optionally, a sinusoidal wave may be produced with high efficiency by arranging either a low-pass filter or a band pass filter after a switching element that generates an output signal with a distortion component. The oscillator 103 may even be a frequency converter that receives an AC input and delivers an output with a high frequency. In any case, the power that has been supplied to the oscillator is converted into RF energy. That RF energy is transmitted wirelessly through the space by the wireless transmission section and then output through the output terminal.

To reduce multiple reflection of the RF energy between the circuit blocks and to improve the overall transmission efficiency, when the output terminal of the power receiving antenna 109 is connected to a load, the output impedance Zoc of the RF energy of the oscillator 103 may be matched to the input impedance Zic of the power transmitting antenna 107. Likewise, when the oscillator 103 is connected to the power transmitting antenna 107, the output impedance Zout of the power receiving antenna may be matched to the resistance value R of the connected load.

In this description, if two impedances are "equal to each other", then the impedances may naturally be exactly equal to each other but could also be just roughly equal to each other. Specifically, if the difference between the greater and smaller impedances is within 25% of the greater one, then those two impedances will also be regarded herein as being "equal to each other".

According to this embodiment, the efficiency of the wireless power transmission depends on the gap between the power transmitting and power receiving antennas 107 and 109 (which will be referred to herein as an "antenna-to-antenna gap") and on the magnitude of loss caused by circuit components that form the power transmitting and power receiving antennas 107 and 109. In this description, the "antenna-to-antenna gap" substantially means the gap between the two inductors 107a and 109a. The antenna-to-antenna gap can be estimated based on the feature size of the areas occupied by those antennas.

Figure 5:
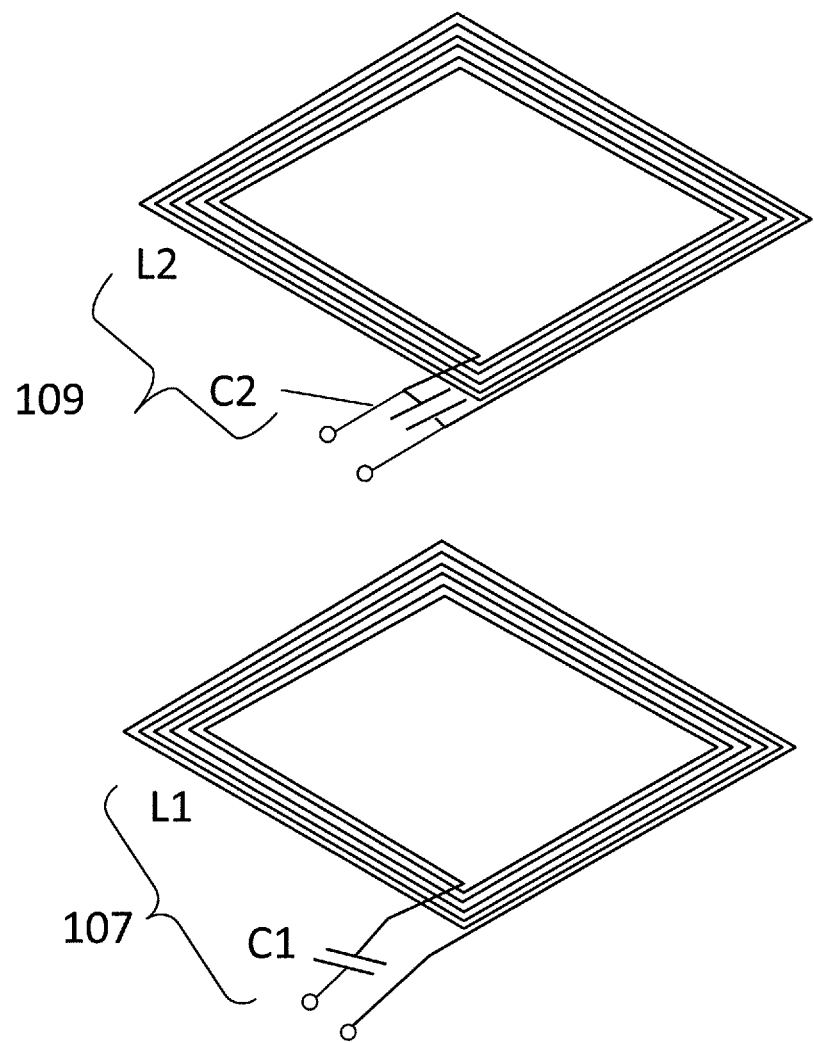
FIG. 5 is a perspective view schematically illustrating a pair of antennas in a wireless power transmission system according to an exemplary embodiment.

In one embodiment of the present disclosure, the first and second inductors 107a and 109a both have the same planar pattern as can be seen from the schematic perspective view shown in FIG. 5. The planar patterns of these inductors may be selected arbitrarily. That is to say, the inductors do not always have to be square or circular ones but may also be rectangular or elliptical ones as well. In this description, the "feature size" of the areas occupied by the antennas refers to an inductor size of the smallest one of the antennas. Specifically, if the inductor of an antenna has a circular planar pattern, then the feature size is defined to be the diameter of the inductor. On the other hand, if the inductor has a square planar pattern, the feature size is defined to be the length of each side thereof. And if the inductor has a rectangular planar pattern, the feature size is defined to be the length of its shorter sides.

In this embodiment, the first and second inductors 107a and 109a have a spiral structure, of which the numbers of turns are N1 and N2, respectively, where N1>1 and N2>1. However, the first and second inductors 107a and 109a may also have a loop structure with a number of turns of one. These inductors 107a and 109a do not have to be made of a single-layer conductor pattern but may also be a series connection of multiple conductor patterns that have been stacked one upon the other.

The first and second inductors 107a and 109a may be made of copper, silver or any other conductor with good electrical conductivity. As RF current with RF energy flows mostly around the surface of a conductor, the surface of the conductor may be covered with a material with high electrical conductivity to increase the power generation efficiency. If the inductors 107a and 109a are designed so as to have a cavity in the middle of its cross section, their weight can be reduced. Furthermore, if the inductors 107a and 109a are formed by adopting a parallel wiring structure with Litz wires, for example, then the conductor loss per unit length can be reduced and the Q factors of the series resonant circuit and the parallel resonant circuit can be increased. As a result, power can be transmitted with even higher efficiency.

To cut down the manufacturing cost, the wiring may be formed at a time by ink printing technique. If necessary, a magnetic body may be arranged near the first and/or second inductor(s) 107a, 109a. Inductors with an air-core spiral structure, which can set the coupling coefficient between the inductors 107a and 109a to a moderate value, may be used.

As the first and second capacitors 107b and 109b, any type of capacitors, which may have a chip shape, a lead shape or any other appropriate shape, may be used. Optionally, the capacitance produced between two levels of wires that interpose the air between them could also function as the first and second capacitors 107b and 109b. If the first and second capacitors 107b and 109b are implemented as MIM capacitors, a low-loss capacitor circuit can be formed by known semiconductor device processing or multilevel circuit board process.

Although it depends on the transmission efficiency of antenna-to-antenna power transmission as required by the system and the value of the coupling coefficient k, the Q factors of the resonators that are used as the power transmitting and power receiving antennas 107 and 109 should be at least 100, and are preferably set to be 200 or more, more preferably 500 or more, and even more preferably 1000 or more. To achieve such high Q factors, it is effective to adopt Litz wires as described above.

EXAMPLES

Example 1

Hereinafter, a first specific example of the present disclosure will be described.

The power transmitting and power receiving antennas were designed so as to have a resonant frequency of 0.55 MHz. Specifically, the power transmitting antenna was fabricated by connecting a first inductor with an inductance of 3.67 µH and a first capacitor with a capacitance of 4100 pF in series together. On the other hand, the power receiving antenna was fabricated by connecting a second inductor with an inductance of 3.67 µH and a second capacitor with a capacitance of 4100 pF in parallel with each other.

Each of the first and second inductors was a Litz wire that had been formed by arranging multiple sets of 120 copper wires, each having a diameter of 75 µm, in parallel with each other so that those sets were electrically insulated from each other. The two inductors both had a circular shape with a diameter of 20 cm and their number of turns was 8. In such a state, the power transmitting antenna (resonator) had a non-loaded Q factor of 450. The power transmitting and power receiving antennas were arranged so that their front sides faced each other and were parallel to each other with a gap g of 10 cm left between them. The resonators thus fabricated had a resonant frequency of 544.6 kHz. The coupling coefficient k between the power transmitting and power receiving antennas was 0.263. The odd-mode resonant frequency was 481.7 kHz and the even-mode resonant frequency was 632 kHz.

With the RF input terminal of the power transmitting antenna and the RF output terminal of the power receiving antenna connected to a network analyzer, the radio frequency transmission characteristic between those two terminals was measured. For that purpose, the best input and output impedances Zin and Zout that would maximize the wireless transmission efficiency between the resonators were derived. The actual measurements were carried out in the following two steps: First of all, the RF characteristic between the input and output terminals of the two antennas (or resonators) was measured with a network analyzer with a terminal impedance of 50Ω, thereby obtaining measurement data with a reference impedance of 50Ω. Next, based on the measurement data thus collected, the impedance conditions Zin and Zout for the input and output terminals and the transmission frequency ftr that would minimize signal reflection at the terminals and that maximize the transmission power were derived on a circuit simulator. Zin, Zout and ftr thus derived were used as transmission conditions Zin (P=Pmax), Zout (P=Pmax) and ftr (P=Pmax) for transmitting the maximum power Pmax.

Next, with the transmission power increased or decreased, a peak frequency that would achieve the maximum transmission efficiency η(P) was derived on a circuit simulator. As the transmission power increases or decreases, Zin and Zout change inversely proportionally to the increasing or decreasing transmission power in order to maintain the same constant-voltage operation condition. In this manner, a peak frequency to be optimized according to the transmission power is obtained. And by setting the transmission frequency ftr(P) to be equal to that peak frequency, the transmission efficiency can be kept high even if the transmission power increases or decreases.

Figure 6:
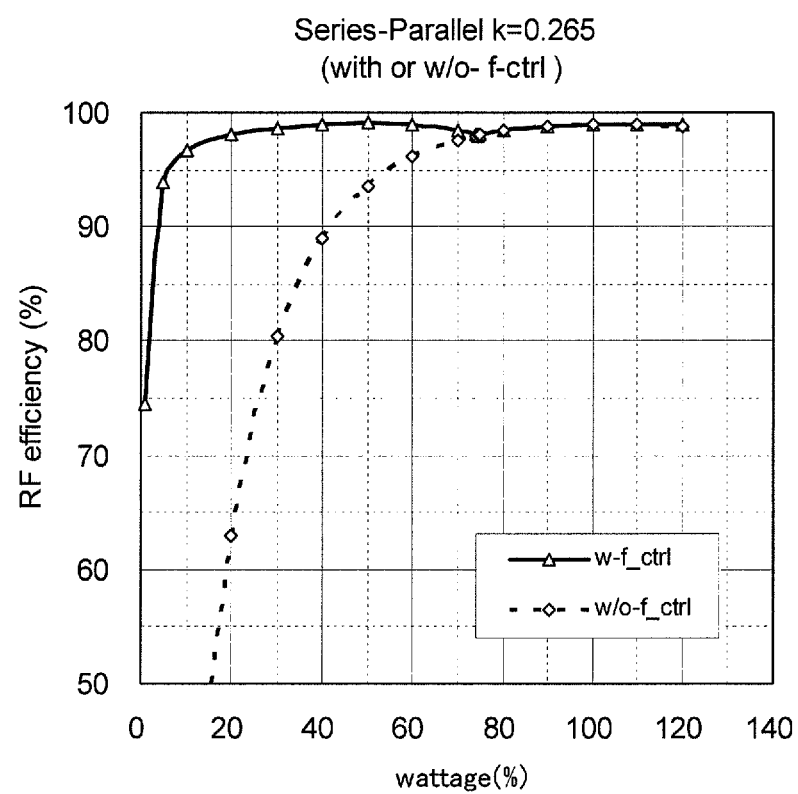
FIG. 6 is a graph showing the transmission power dependence of the transmission efficiency of a wireless transmission section in a specific example of the present disclosure.

FIG. 6 is a graph showing the transmission power dependence of η(P) thus derived. In the graph shown in FIG. 6, the ordinate represents the maximum transmission efficiency η and the abscissa represents the power to be transmitted. The condition on which the abscissa of this graph becomes equal to 100% corresponds to a situation where P=Pmax. For the purpose of comparison, the behavior of η(P) in a situation where the transmission frequency ftr is fixed at ftr (P=Pmax) is also plotted by the dotted curve on this graph.

In this first specific example, P1 account for 74.5% of Pmax. Comparing the solid and dotted curves shown in FIG. 6 to each other, the present inventors discovered that the effect of this specific example was achieved particularly significantly in a range where P<Pmax×60%.

Figure 7:
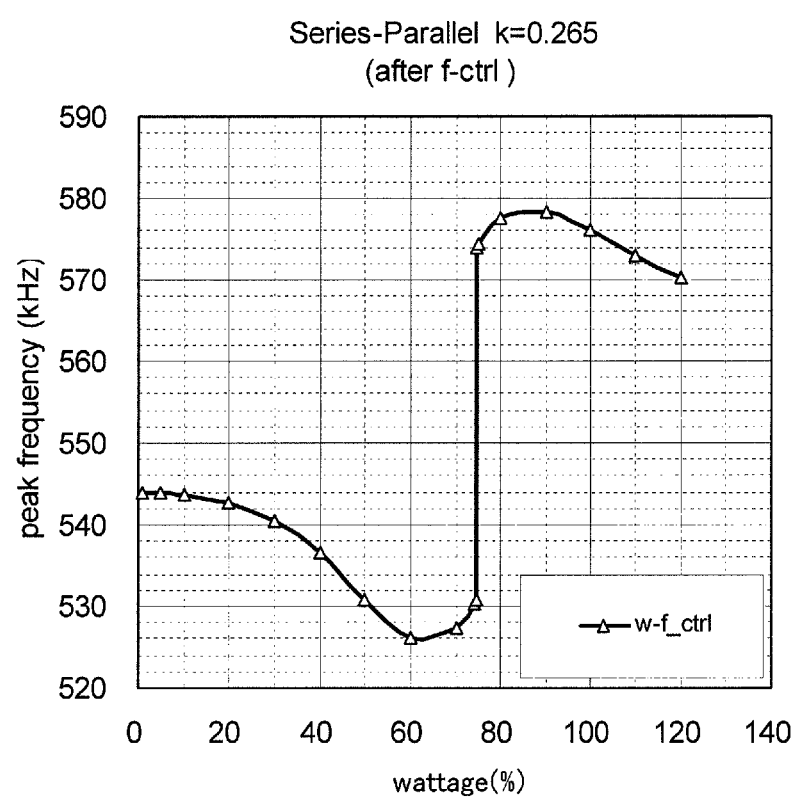
FIG. 7 is a graph showing the transmission power dependence of the frequency in a specific example of the present disclosure.

FIG. 7 is a graph showing the transmission power dependence of the peak frequency thus derived (corresponding to ftr(P)). When P<P1, ftr(P) satisfied fL (=481.7 kHz)<ftr(P) <f0 (=544.6 kHz). On the other hand, when P≥P1, ftr(P) satisfied f0<ftr(P)<fH (=632 kHz). In the entire range, ftr(P) satisfied 526.1 kHz≤ftr(P)≤578.3 kHz.

The ratio of the magnitude of variation from the natural frequency to the minimum ftr(P) value with respect to that from the natural frequency to the odd-mode resonant frequency (calculated by Rlow=(f0−ftrmin)÷(f0−fL)×100) was 29.4%. On the other hand, the ratio of the magnitude of variation from the maximum ftr(P) value to the natural frequency with respect to that from the even-mode resonant frequency to the natural frequency (calculated by Rhigh=(ftrmax−f0)÷(fH−f0)×100) was 38.6%.

Next, systems, of which the distance between the power transmitting and power receiving antennas was changed as shown in the following Table 1 (and which represent second through sixth specific examples of the present disclosure), were evaluated. Those second through sixth specific examples of the present disclosure had the same basic configuration as, but a different coupling coefficient k from, the first specific example described above. This is because the coupling coefficient k depends on the distance between the power transmitting and power receiving antennas.

Figure 8:
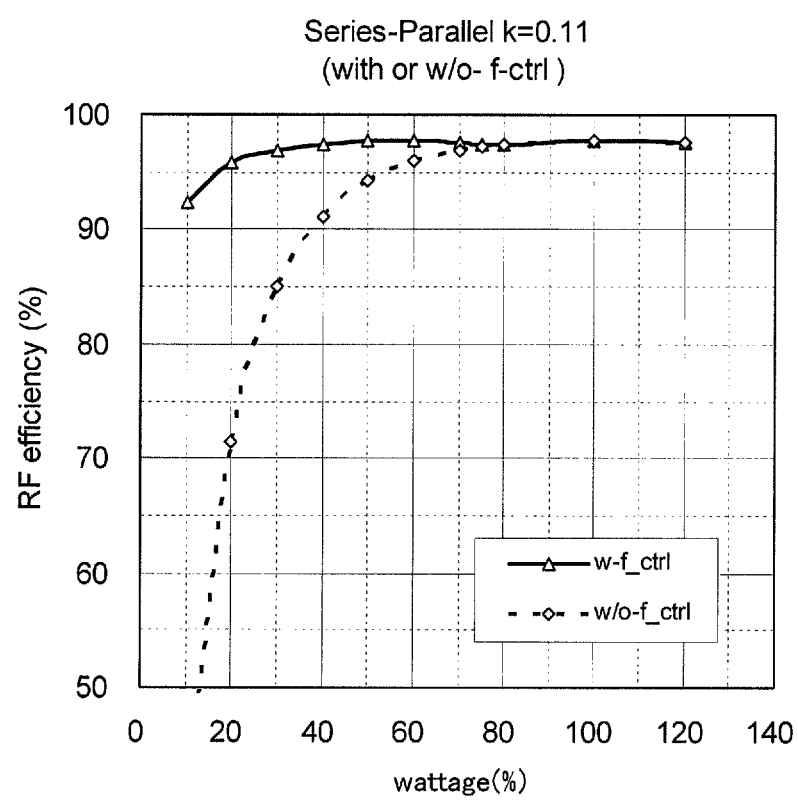
FIG. 8 is a graph showing the transmission power dependence of the frequency in a specific example of the present disclosure.

FIG. 8 is a graph showing the transmission power dependence of the maximum transmission efficiency of the wireless section as for the fifth specific example of the present disclosure. As can be seen from FIG. 8, even in that fifth specific example, high transmission efficiency can be maintained in a range where the transmission power is small.

TABLE 1

|  | Distance (cm) | k | fL | fH | P1/Pmax | Rlow | Rhigh |
| --- | --- | --- | --- | --- | --- | --- | --- |
| Example 2 | 3 | 0.403 | 457.8 | 702.0 | 65 | 42.4 | 55.7 |
| Example 3 | 4 | 0.324 | 471.1 | 659.0 | 67 | 36.6 | 48.7 |
| Example 1 | 5 | 0.265 | 481.7 | 632.0 | 74.5 | 29.4 | 38.6 |
| Example 4 | 7.5 | 0.169 | 501.6 | 595.1 | 73 | 21.2 | 24.0 |
| Example 5 | 10 | 0.11 | 513.0 | 573.9 | 78 | 32.3 | 18.8 |
| Example 6 | 15 | 0.056 | 529.1 | 559.7 | 62 | 37.4 | 33.1 |

As can be seen from Table 1, the present inventors discovered that the same effects as those of the first specific example were achieved in a broad coupling coefficient k range of 0.056 through 0.403. When the resonators were coupled together with a coupling coefficient k falling within such a broad range, P1 was in the range of 62% to 78%, Rlow was in the range of 21.2% to 42.4%, and Rhigh was in the range of 18.8% to 55.7%.

The same effects were also achieved even when the power transmitting and power receiving antennas were changed with each other (i.e., even when the power transmitting antenna was implemented as a parallel resonant circuit and the power receiving antenna was implemented as a series resonant circuit).

Comparative Examples 1 and 2

Figure 9:
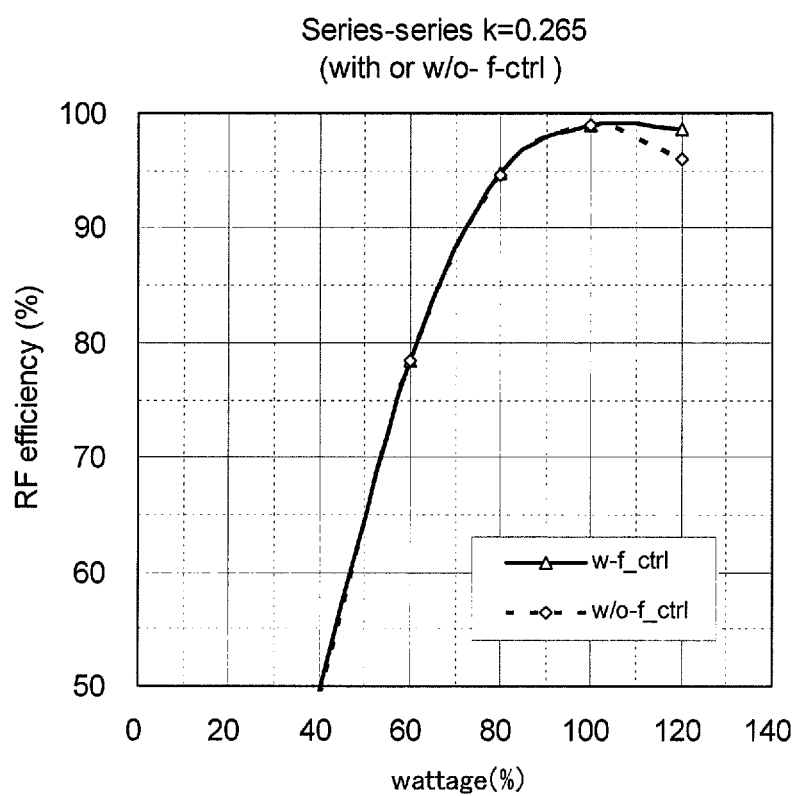
FIG. 9 is a graph showing the transmission power dependence of the transmission efficiency of a wireless transmission section in an example to be compared to the present disclosure.
Figure 10:
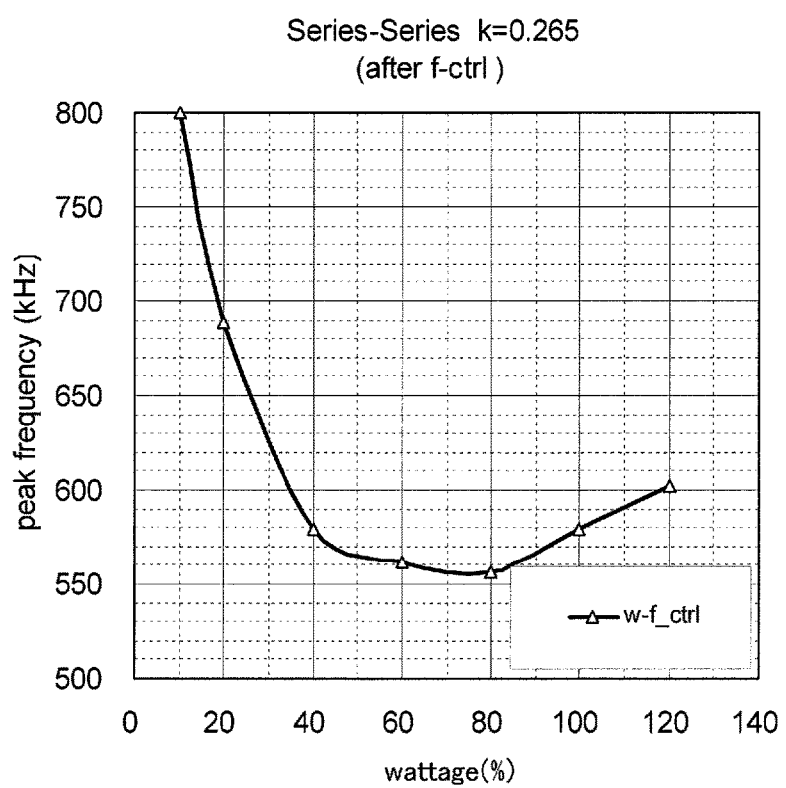
FIG. 10 is a graph showing the transmission power dependence of the peak efficiency in the example to be compared to the present disclosure.
Figure 11:
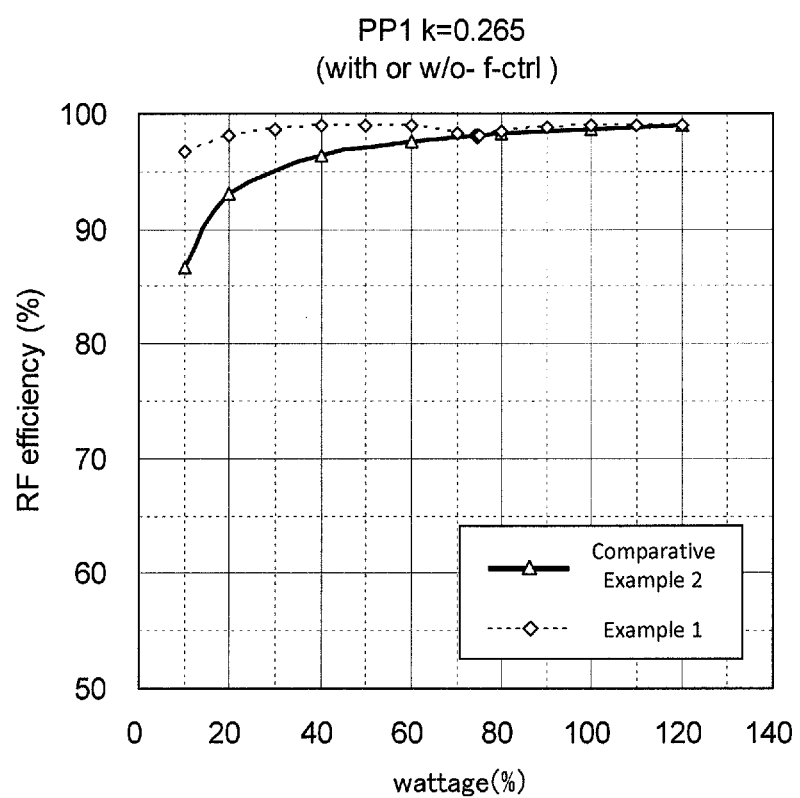
FIG. 11 is a graph showing the transmission power dependence of the transmission efficiency of a wireless transmission section in another example to be compared to the present disclosure.
Figure 12:
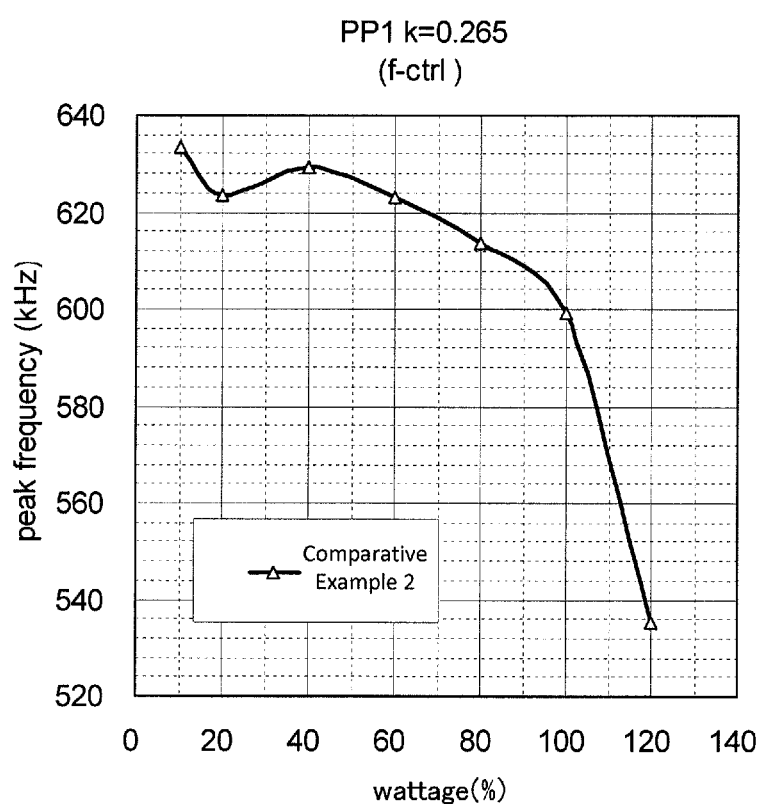
FIG. 12 is a graph showing the transmission power dependence of the peak efficiency in the example to be compared to the present disclosure.

In the first specific example of the present disclosure described above, the power transmitting and power receiving antennas are supposed to be an asymmetric combination of resonant circuits. For the purpose of comparison, wireless power transmission systems, of which the power transmitting and power receiving antennas were implemented as a symmetric combination of resonant circuits, were made as Comparative Examples 1 and 2. Specifically, in Comparative Example 1, the power transmitting and power receiving antennas were both implemented as series resonant circuits. In Comparative Example 2, on the other hand, the power transmitting and power receiving antennas were both implemented as parallel resonant circuits. Those comparative examples were also evaluated as in the first through sixth specific examples of the present disclosure described above, thereby deriving not only the maximum transmission efficiencies at the respective transmission powers in the constant-voltage operation mode but also peak frequencies that would achieve the maximum transmission efficiencies. As can be seen from FIG. 9, which shows the transmission power dependence of the transmission efficiency of Comparative Example 1, the transmission efficiency of Comparative Example 1 was hardly improved in a small power transmission range. Also, as can be seen easily from FIG. 10, the smaller the power transmitted, the even higher the peak frequency of Comparative Example 1 than the even-mode resonant frequency of 632 Hz, which means that the frequency control condition of the present disclosure was not satisfied, either. Likewise, as can be seen from FIGS. 11 and 12 showing the transmission power dependences of the transmission efficiency and peak frequency in Comparative Example 2, the effects of the present disclosure were not achieved in Comparative Example 2, either.

Comparative Example 3

Figure 14:
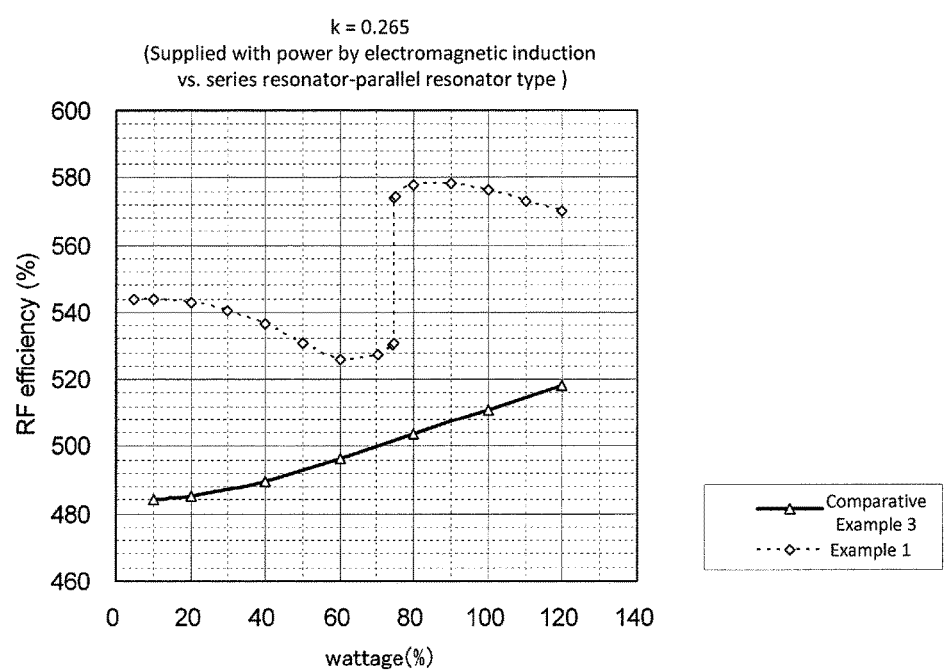
FIG. 14 is a graph showing the transmission power dependence of the peak efficiency in the example to be compared to the present disclosure.

In the first specific example of the present disclosure described above, a signal is supposed to be supplied from an external circuit to power transmitting and power receiving antennas by connecting RF input and output terminals for measuring directly to the power transmitting and power receiving antennas. In this third comparative example, on the other hand, a signal was supplied from the external circuit to the power transmitting and power receiving antennas based on the principle of electromagnetic induction. More specifically, a non-resonant coil with a diameter of 20 cm and a number of turns of 6 was arranged at a distance of 3 mm from each of the power transmitting and power receiving antennas so as to face it, and excited by an external circuit, thereby making the non-resonant coil excite the power transmitting and power receiving antennas by a non-contact method. This comparative example was also evaluated as in the first through sixth specific examples of the present disclosure described above, thereby deriving not only the maximum transmission efficiencies at the respective transmission powers in the constant-voltage operation mode but also peak frequencies that would achieve the maximum transmission efficiencies. As can be seen easily by comparing FIG. 13, which shows the transmission power dependences of the transmission efficiencies of Comparative Example 3 and Example 1 of the present disclosure, to FIG. 6, the decrease in maximum transmission efficiency with a decrease in power transmitted was more significant in Comparative Example 3 than in Example 1. And in every transmission power range, the maximum transmission efficiency achieved by Comparative Example 3 was lower than the one achieved by Example 1. For example, when the power transmitted was set to be 10%, the maximum transmission efficiency was 97.3% in Comparative Example 3 but was 99.0% in Example 1. Also, as can be seen easily from FIG. 14, as the power transmitted increases, the peak frequency increases monotonically in Comparative Example 3, which means that the frequency control condition of the present disclosure was not satisfied. And this result also reveals that the arrangement of Comparative Example 3 copes with a variation in power transmitted by using only the odd-mode resonance, which is different from the principle of operation of the present disclosure that makes full use of the even and odd resonance modes.

Comparative Examples 4 and 5

In Comparative Examples 4 and 5, power was supplied directly to one of the power transmitting and power receiving antennas, and supplied by electromagnetic induction to the other antenna. When the power was supplied directly, the same condition as that of the first through sixth specific examples of the present disclosure described above was also adopted. On the other hand, when the electromagnetic induction method was used, the condition adopted was the same as what was used in Comparative Example 3. The following Table 2 shows in comparison the respective circuit configurations of Example 1 and Comparative Examples 1 through 5.

Figure 15:
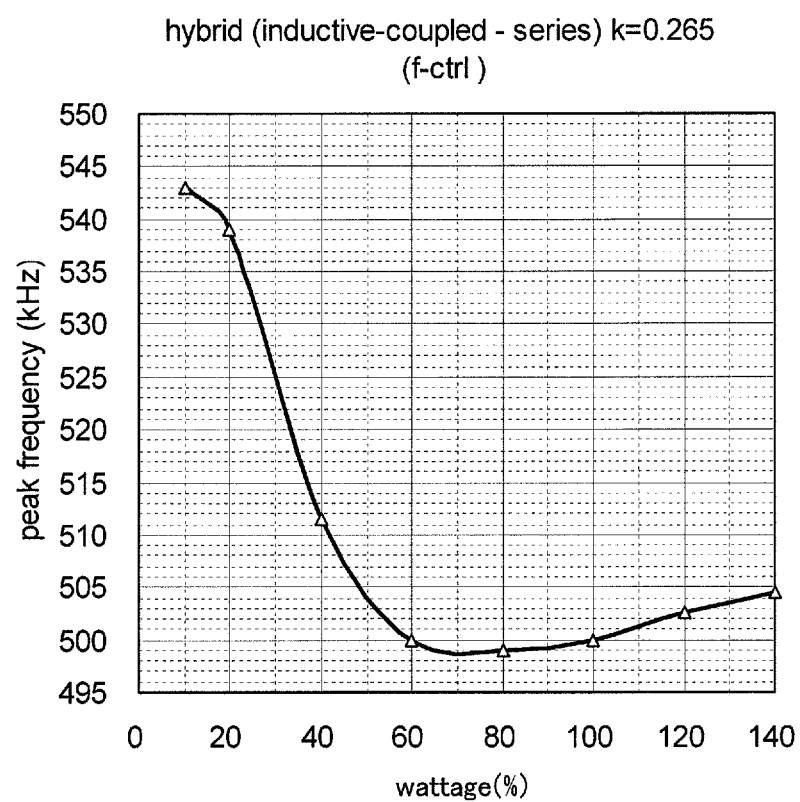
FIG. 15 is a graph showing the transmission power dependence of the peak efficiency in yet another example to be compared to the present disclosure.
Figure 16:
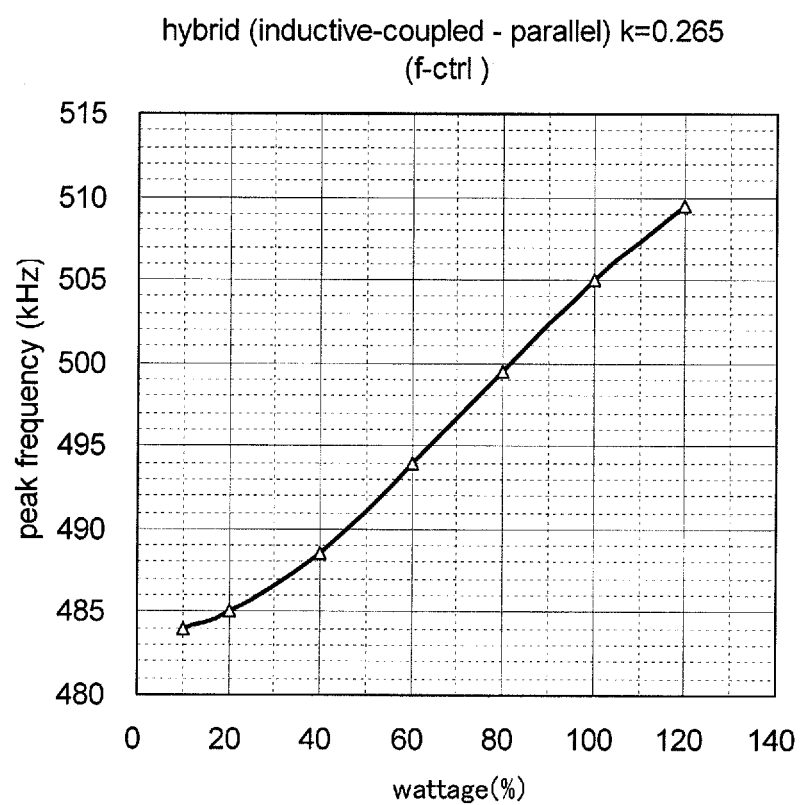
FIG. 16 is a graph showing the transmission power dependence of the peak efficiency in yet another example to be compared to the present disclosure.

These Comparative Examples 4 and 5 were also evaluated as in the first through sixth specific examples of the present disclosure described above, thereby deriving not only the maximum transmission efficiencies at the respective transmission powers in the constant-voltage operation mode but also peak frequencies that would achieve the maximum transmission efficiencies. As can be seen easily from FIG. 15, the smaller the power transmitted, the higher the peak frequency tends to be in Comparative Example 4, which means that the frequency control condition of the present disclosure was not satisfied. Likewise, as can be seen easily from FIG. 16 showing the transmission power dependence of the peak frequency in Comparative Example 5, the frequency control condition of the present disclosure was not satisfied in Comparative Example 5, either.

TABLE 2

| | Distance (cm) | k | Power transmitting antenna | Power receiving antenna | Effect/frequency control of this disclosure |
|---|---|---|---|---|---|
| Ex. 1 | 5 | 0.265 | Series resonant circuit | Parallel resonant circuit | Achieved/performed |
| Com. Ex. 1 | | | Series resonant circuit | Series resonant circuit | Not achieved/not performed |
| Com. Ex. 2 | | | Parallel resonant circuit | Parallel resonant circuit | |
| Com. Ex. 3 | | | Supplied with power by electromagnetic induction | Supplied with power by electromagnetic induction | |
| Com. Ex. 4 | | | | Series resonant circuit | |
| Com. Ex. 5 | | | | Parallel resonant circuit | |

The wireless power transmission system of the present disclosure can be used as a power supplying system for supplying power to various devices (including a TV set and other audiovisual devices and washers, refrigerators, air conditioners and other household electronic appliances) which can operate with power supplied from a power supply circuit that applies a constant voltage.

In addition, the wireless power transmission system of the present disclosure is also applicable as a charging system for various electronic devices, electric motorcycles, electric bicycles, and electric cars that use a rechargeable battery. This is because a rechargeable battery such as a lithium battery sometimes needs to have its charge operation controlled at a constant voltage. Furthermore, the system of the present disclosure is also applicable for use in any electronic device with a motor to be driven at a constant voltage.

Moreover, it is known that if the intensity (or illuminance) of sunlight that irradiates a solar cell in a solar power generation system changes, the maximum power point (i.e., a current or voltage value at which the maximum power can be generated) is substantially proportional to illuminance as for current and becomes almost constant as for voltage. Consequently, the wireless power transmission system of the present disclosure is also applicable to a system that collects the power that has been generated by a solar power generation system.

While the exemplary embodiments of the invention has been described, it will be apparent to those skilled in the art that the disclosed exemplary embodiments may be modified in numerous ways and may assume many embodiments other than those specifically described above. Accordingly, it is intended by the appended claims to cover all modifications of the exemplary embodiments that fall within the true spirit and scope of the invention.

What is claimed is:

1. A wireless power transmission apparatus comprising:
   a transmitting antenna configured to magnetically couple and resonate with a receiving antenna included in a power receiving apparatus at a resonant frequency (f0) that falls within a first frequency range extending from a minimum transmission frequency (ftrmin) to a maximum transmission frequency (ftrmax), wherein one of the transmitting antenna and the receiving antenna is a series resonant circuit, and the other of the transmitting antenna and the receiving antenna is a parallel resonant circuit; and
   a control circuit configured to control a transmission frequency within the first frequency range according to a magnitude of electric power to be transmitted from the transmitting antenna to the receiving antenna,
   wherein when the transmitting antenna magnetically couples and resonates with the receiving antenna at the resonant frequency f0, the resonant frequency f0 splits into a first resonant frequency (fL) being lower than the resonant frequency (f0) and a second resonant frequency (fH) being higher than the resonant frequency (f0),
   wherein if the magnitude of the electric power to be transmitted is greater than a reference magnitude, the control circuit sets the transmission frequency to be a value that falls within a second frequency range extending from the resonant frequency (f0) to the maximum transmission frequency (ftrmax), and
   wherein if the magnitude of the electric power to be transmitted is smaller than the reference magnitude, the control circuit sets the transmission frequency to be a value that falls within a third frequency range extending from the minimum transmission frequency (ftrmin) to the resonant frequency (f0).

2. The wireless power transmission apparatus according to claim 1, wherein
   if the magnitude of the electric power to be transmitted is changed from a first value that is greater than the reference magnitude into a second value that is smaller than the reference magnitude, the control circuit switches the transmission frequency from the second frequency range to the third frequency range, and
   if the magnitude of the electric power to be transmitted is changed from the second value into the first value, the control circuit switches the transmission frequency from the third frequency range to the second frequency range.

3. The wireless power transmission apparatus according to claim 1, wherein the reference magnitude is set to be 60% through 80% of a maximum transmission power Pmax.

4. The wireless power transmission apparatus according to claim 1, further comprising an oscillator to which the control circuit sets the transmission frequency and which adjusts the magnitude of the electric power to be transmitted from the transmitting antenna,
wherein when the power receiving apparatus is activated, an input impedance Zin of the transmitting antenna is equal to an output impedance Zoc of the oscillator.

5. The wireless power transmission apparatus according to claim 1, wherein if the magnitude of the electric power to be transmitted is equal to the reference magnitude, the control circuit sets the transmission frequency to be the resonant frequency (f0).

6. The wireless power transmission apparatus according to claim 1, wherein the minimum transmission frequency (ftrmin) is higher than the first resonant frequency (fL), and the maximum transmission frequency (ftrmax) is lower than the second resonant frequency (fH).

7. The wireless power transmission apparatus according to claim 1, wherein if the magnitude of the electric power to be transmitted is a first magnitude that is greater than the reference magnitude, the control circuit sets the transmission frequency to be the maximum transmission frequency (ftrmax), and if the the magnitude of the electric power to be transmitted is greater than the first magnitude, the control circuit sets the transmission frequency to be a value that is greater than the resonant frequency (f0) and smaller than the maximum transmission frequency (ftrmax), and
wherein if the magnitude of the electric power to be transmitted is a second magnitude that is smaller than the reference magnitude, the control circuit sets the transmission frequency to be the minimum transmission frequency (ftrmin), and if the the magnitude of the electric power to be transmitted is smaller than the second magnitude, the control circuit sets the transmission frequency to be a value that is smaller than the resonant frequency (f0) and greater than the minimum transmission frequency (ftrmin).

8. A wireless power transmission system comprising a power transmitting apparatus and a power receiving apparatus comprising a receiving antenna, the power transmitting apparatus comprising:
a transmitting antenna configured to magnetically couple and resonate with the receiving antenna included in the power receiving apparatus at a resonant frequency (f0) that falls within a first frequency range extending from a minimum transmission frequency (ftrmin) to a maximum transmission frequency (ftrmax), wherein one of the transmitting antenna and the receiving antenna is a series resonant circuit, and the other of the transmitting antenna and the receiving antenna is a parallel resonant circuit; and
a control circuit configured to control a transmission frequency within the first frequency range according to a magnitude of electric power to be transmitted from the transmitting antenna to the receiving antenna,
wherein when the transmitting antenna magnetically couples and resonates with the receiving antenna at the resonant frequency f0, the resonant frequency f0 splits into a first resonant frequency (fL) being lower than the resonant frequency (f0) and a second resonant frequency (fH) being higher than the resonant frequency (f0),
wherein if the magnitude of the electric power to be transmitted is greater than a reference magnitude, the control circuit sets the transmission frequency to be a value that falls within a second frequency range extending from the resonant frequency (f0) to the maximum transmission frequency (ftrmax), and
wherein if the magnitude of the electric power to be transmitted is smaller than the reference magnitude, the control circuit sets the transmission frequency to be a value that falls within a third frequency range extending from the minimum transmission frequency (ftrmin) to the resonant frequency (f0).

9. The wireless power transmission system according to claim 8, wherein if the magnitude of the electric power to be transmitted is equal to the reference magnitude, the control circuit sets the transmission frequency to be the resonant frequency (f0).

10. The wireless power transmission system according to claim 8, wherein the minimum transmission frequency (ftrmin) is higher than the first resonant frequency (fL), and the maximum transmission frequency (ftrmax) is lower than the second resonant frequency (fH).

11. The wireless power transmission system according to claim 8, wherein if the magnitude of the electric power to be transmitted is a first magnitude that is greater than the reference magnitude, the control circuit sets the transmission frequency to be the maximum transmission frequency (ftrmax), and if the the magnitude of the electric power to be transmitted is greater than the first magnitude, the control circuit sets the transmission frequency to be a value that is greater than the resonant frequency (f0) and smaller than the maximum transmission frequency (ftrmax), and
wherein if the magnitude of the electric power to be transmitted is a second magnitude that is smaller than the reference magnitude, the control circuit sets the transmission frequency to be the minimum transmission frequency (ftrmin), and if the the magnitude of the electric power to be transmitted is smaller than the second magnitude, the control circuit sets the transmission frequency to be a value that is smaller than the resonant frequency (f0) and greater than the minimum transmission frequency (ftrmin).

* * * * *